Dec. 29, 1959     W. C. RUDD     2,919,343
WELDING OF STRIPS
Filed March 20, 1958     2 Sheets-Sheet 1
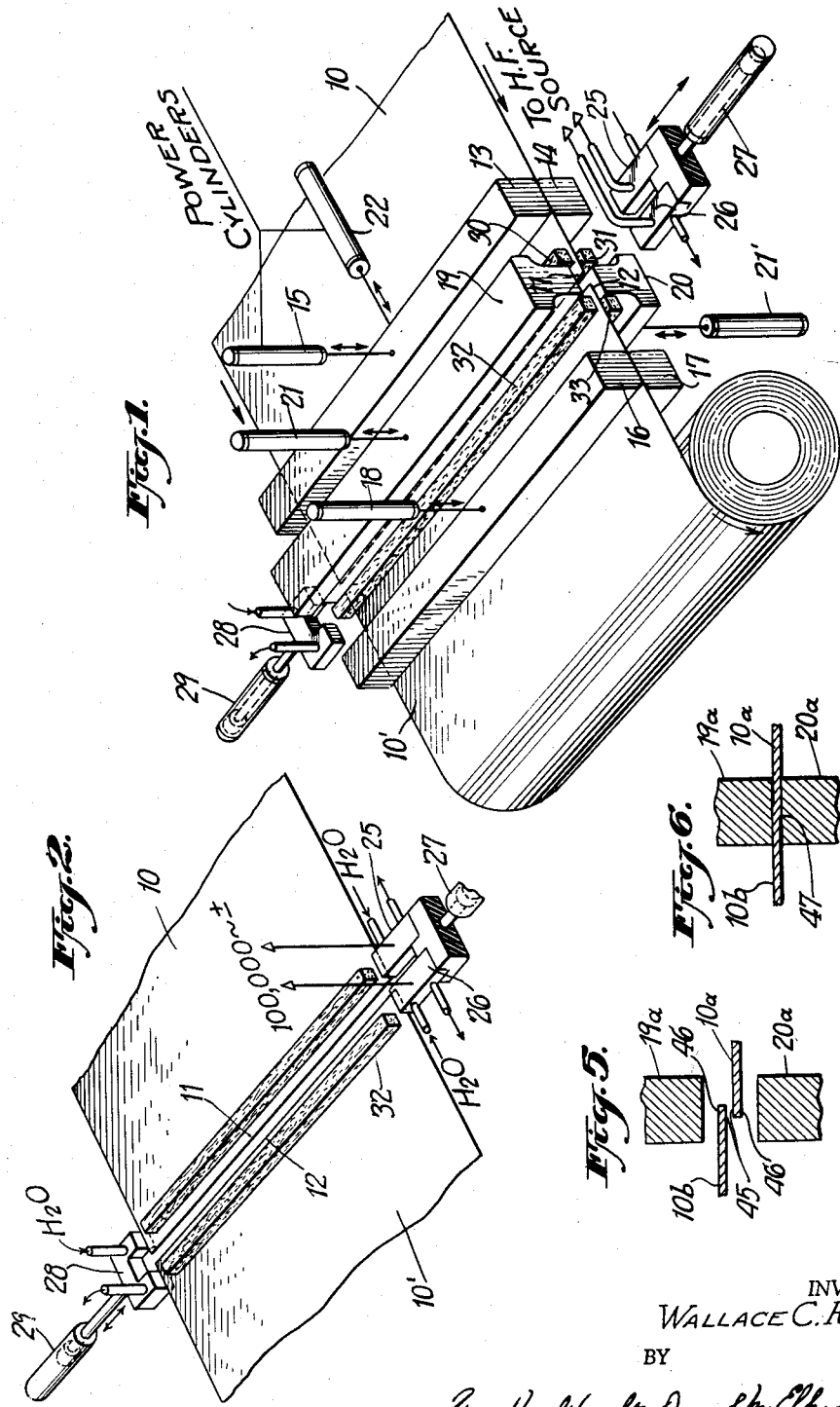
INVENTOR.
WALLACE C. RUDD.
BY
*Ward, Neal, Haselton, Orme & McElhannon*
ATTORNEYS.

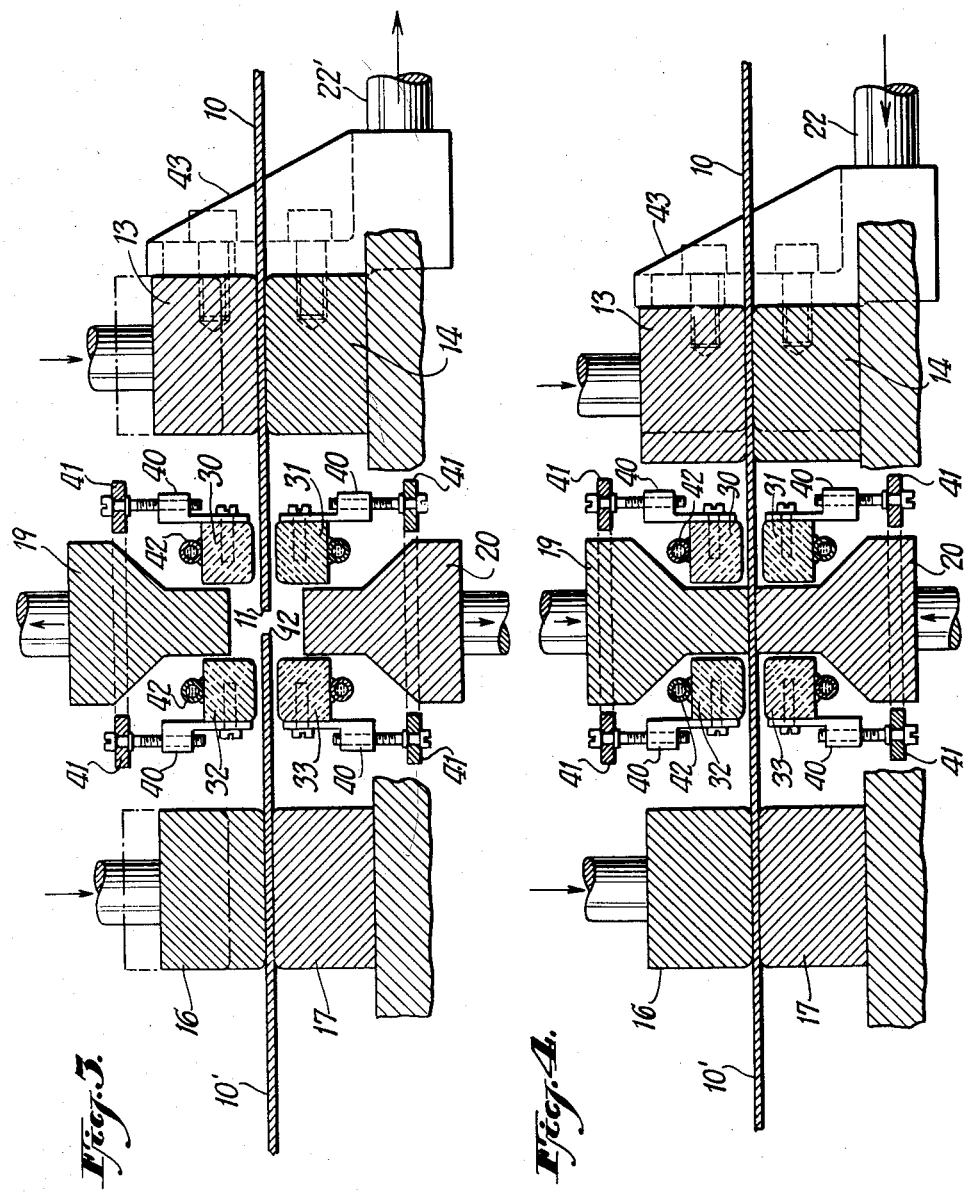

United States Patent Office 2,919,343
Patented Dec. 29, 1959

2,919,343
WELDING OF STRIPS

Wallace C. Rudd, Larchmont, N.Y., assignor to Magnetic Heating Corp., New Rochelle, N.Y., a corporation of New York Application March 20, 1958, Serial No. 722,788

11 Claims. (Cl. 219—104)

This invention relates to methods and apparatus for welding metal portions together by resistance heating through the use of high frequency electrical currents conducted to and along the metal edge surfaces which are to be welded. Among other possible uses, the invention is particularly well adapted for the butt welding or lapped welding of the edges together on opposed pieces of sheet steel or on opposed ends of pieces of metal strips.

Many years ago, Edward Bennett, as disclosed in his U.S. Patent No. 2,066,668, proposed to heat to welding temperature the spaced-apart edges of two sheet metal pieces, by connecting a source of high frequency current to flow along the edge of the first piece to the remote end of such edge, thence over to the remote end of the edge of the other piece and back along the edge of such other piece to the source. He assumed that the high frequency currents flowing in opposite directions respectively on the two closely-spaced edges, would, by mutual induction, be caused to be concentrated on the edge surfaces to heat same to proper welding temperature, whereupon the current was to be cut off and the heated edges forced together. As a variation of such method, he proposed that currents be connected to flow in the same direction along the two spaced-apart edges and caused to be concentrated at such edges by a conductor interposed therebetween and on which current flows in the opposite direction. However, these methods, so far as is known, have never been found to have any commercial or practical utility and were in fact by tests found to be practically inoperative in the usual case, for the following reasons. While the well known mutual inductance effect with the high frequency current tends to concentrate the flow of current along the edges to be welded, yet it did not, with the benefit of the Bennett proposals, do so with a satisfactory degree of uniformity. Instead, while toward the ends of the edges to be welded the current would heat the edges to welding temperature, yet along intermediate portions of the edges, the current flow would not be sufficiently concentrated at the edges to heat same to welding temperature until after the end portions of the edges were overheated. Or if the midportions of the edges were heated to proper welding temperature, then the end portions on which the current was more concentrated, by that time would be overheated and become too soft for making a good weld, particularly if the edges are of any substantial length. But tests have shown that the same troublesome difficulty exists even if the edges to be welded are no longer than an inch or two. A further difficulty arose from the fact that the heating of the edges to welding temperature, and particularly the non-uniform heating as just explained, caused prohibitive warping of the edge portions, so that when forged together, the welded areas would be wavy and embody prohibitive humps and valleys. Also, in the above-mentioned patent, the highest frequency taught was 30,000 cycles per second, and at that frequency the mutual inductance between the spaced-apart edges carrying the heating current does not cause such concentration of current in the heated edges as to either efficiently heat the very edge surfaces to be welded, or to do so without heating and softening the metal in back of the edges to a degree causing warping and interference with the desirable firm "backing" of the metal when forced together at the welded seam.

In accordance with the present invention, it has been found that the above-noted problems may be solved by the use of expedients which will modify and control the impedance to the high frequency current flowing along the spaced-apart edges to be welded, and so as to secure the desired uniform heating, but the current otherwise being applied according to the above-mentioned Bennett method. More specifically, in accordance with the invention, a mass or masses of magnetic material are placed in spaced relation back from the edges to be welded and in spaced relation also to the metal being welded, and such magnetic masses will serve to increase the impedance of current paths running along in spaced relation to the edges to be welded, thereby effectively forcing the current to follow paths at or so close to the edges to be welded as to make possible the desired uniform heating therealong. Also, to accomplish the desired results, the high frequency current used is preferably of a frequency of the order of 100,000 cycles per second or higher, and with such frequencies, it is necessary that the above-mentioned masses of magnetic material used be of substantially an insulating nature, having high volume resistivity and good permeability, among other qualities. Also, at the time the edges to be welded are forced together, preferably means are provided for rigidly clamping same to hold them in alignment and against any danger of warping or appreciable bulging. With this combination of features, it becomes possible to secure a satisfactory weld and the surfaces to be welded are softened to welding temperature uniformly therealong and only to a depth of several thousandths of an inch or less, with the result that the crystalline structure of the metal is left free of objectionable disturbance.

The invention is well adapted for butt welding securely together the ends of steel strips as in the pickling lines in steel mills, in rolling mill lines, or when making continuous strip to be formed into tubing. The edges of large areas of sheet steel and other metals such as aluminum and high conductivity copper, may also be welded together efficiently by the invention.

Various further and more specific objects, features and advantages of the invention will appear from the description given below, taken in connection with the accompanying drawings, illustrating by way of example preferred forms of the invention.

In the drawings:

Fig. 1 is a perspective view showing somewhat diagrammatically various portions of the apparatus for carrying out the invention;

Fig. 2 is a perspective view showing certain parts of the apparatus of Fig. 1 in the positions which they assume during the heating step;

Fig. 3 is a vertical sectional view of apparatus similar to that of Fig. 1 and showing various parts in further detail and in the condition they assume during the heating period;

Fig. 4 is a view similar to Fig. 3 but showing the parts in the positions which they assume during the final welding step.

Fig. 5 is a sectional view similar to that of Fig. 3 but showing only certain of the parts broken away as used in accordance with an alternative embodiment of the invention for making a lapped weld; and Fig. 6 is a view similar to Fig. 5 but showing the relationship of the parts after the lapped weld has been completed.

Referring now to the drawings in further detail, in Fig. 1, a strip or band of metal, for example sheet steel, is indicated at 10, having an end edge 11, which is to be welded to an end edge 12 and on another length 10' of such sheet material which, as a continuous strip, may be rolled up as indicated at the lefthand side of Fig. 1, at each time after an additional strip has been welded to the trailing end of the continuing strip.

The strip 10 may initially be clamped between upper and lower clamping jaws 13, 14, and in a position such that the edge 11 is spaced from the edge 12 by a short distance, for example one-sixteenth inch up to one-quarter inch or thereabouts. Suitable means such as a power cylinder (schematically indicated at 15) may be used to raise and lower under pressure the jaw 13 for engagement and disengagement with the strip 10 and for clamping same with respect to the lower jaw 14. The strip 10' may similarly be retained between upper and lower jaws or clamping members 16 and 17, controlled by a power cylinder as at 18.

Further upper and lower clamping jaws as at 19, 20 under the control of power cylinders as at 21, 21', are provided for engaging the edges 11 and 12 after they have been heated and the power has been shut off, for holding them in alignment, just as they have been shoved together for welding. That is, the clamping jaws 13 and 14 with the strip 10 held therebetween, may, after its edge 11 has been heated to welding temperature, be shoved forwardly as by a power cylinder 22 to bring the edges 11 and 12 into position to form a forged butt weld therebetween, just as the clamping jaws 19 and 20 are brought into clamping position with the heated edges.

The terminals of the source of high frequency current respectively are connected to contacts 25, 26, which are adapted to be moved as by power cylinder 27 up into engagement with or near the side edges of the metal pieces 10 and 10' to be welded. At the opposite or remote ends of the edges 11, 12, a U-shaped contact 28 is provided for also engaging the side edges of the metal sheets or members 10, 10'. The position of this contact piece may also be controlled as by a power cylinder 29. These various contacts, as indicated, may be formed with cooling fluid conduits and when the contacts are brought into engagement with the metal members to be welded, it will be apparent that the current from the source will flow through contact 25, along edge 11 to contact 28, back along edge 12 and to contact 26, thence to the other terminal of the high frequency source.

But with the apparatus as thus far described, the paths of current flow along the edges 11 and 12, would diverge or expand considerably away from such edges at regions along the mid-portions of the sheets 10 and 10', and despite the mutual inductance effect between the currents on these closely spaced edges. Hence the edges at their central regions would still remain below welding temperature after the portions of the edges nearer the contacts would have become too hot for satisfactory welding. To overcome this difficulty in accordance with the invention, strips of magnetic material as at 30, 31, 32 and 33, are mounted in positions as shown, strips 30, 31 being spaced a short distance back from the edge 11 and being spaced respectively just above and below the sheet 10 and out of contact therewith. The magnetic strips or bars 32, 33 are similarly located in positions spaced apart from the edge 12 and spaced slightly above and below sheet 10'. Such strip material may be formed of sintered magnetic oxide, an insulating material, preferably of types well known per se and which will have a low loss factor and high volume resistivity, for example such as the ceramic magnetic material marketed under the name Ferramic by General Ceramic & Steatite Corp. It will be understood that other magnetic means may be used, but preferably the same should have a permeability substantially greater than unity, and if the magnetic material therein is in particle form, same should be finely divided so that current losses therein will be largely avoided. Finely divided iron carbonyl mixed with a suitable insulating material might also be used, for example.

These strips or bars of magnetic material which sometimes need only extend along the mid-portions of the edges 11 and 12, will serve, as above explained, to so increase the impedance to the high frequency current along paths spaced from the edges 11 and 12, that such current will be forced to flow along on the very edge surfaces and with a sufficient degree of uniformity to make possible substantially uniform heating of the edges throughout their lengths.

Fig. 2 shows more clearly the arrangement of these magnetic strips 30, 32 with respect to the edges 11 and 12 and this figure further showing the contacts 25, 26 and 28 in positions to engage the sheets 10 and 10' for applying the current thereto.

As shown in Figs. 3 and 4, the magnetic strips 30—33 may be conveniently mounted in normally fixed but adjustable positions by suitable adjustable brackets as at 40, mounted on suitable stationary cross bars as at 41. As indicated at 42, each of the magnetic strips, if desired, may also be accompanied by cooling fluid conduits.

As further shown in Figs. 3 and 4, the clamping jaws 13 and 14 may be interconnected by bracket means as at 43 in such a manner as to permit the upper jaw to be raised with respect to the lower jaw and in such manner that the power cylinder 22, above referred to in connection with Fig. 1, may be connected to a piston rod 22' for moving the assembly 10, 13 and 14 as a whole, to advance the edge 11 to welding position with the edge 12.

After the high frequency current has been connected and applied as above explained, and as soon as the edge surfaces at 11, 12 reach welding temperature, the current is cut off as by the use of a timing switch and then, by suitable automatic timing means of known type, the power cylinder 22 may be actuated to cause the edges 11 and 12 to be brought under pressure together, just as the jaws 19, 20 are actuated to bring such jaws into firm engagement under pressure with the upper and lower sides of the desired welded seam in the manner indicated in Fig. 4. The control of the jaws 19 and 20 at this time may also be effected by the use of any suitable automatic timing means acting to control power cylinders 21 and 21'. Shortly after the edges 11 and 12 have been brought together under pressure and the weld formed, the various jaws may then be automatically released to allow the sheet or web 10' to be advanced with the sheet 10 now welded to the trailing end thereof.

As above mentioned, it is preferable that the high frequency used be of the order of about 100,000 cycles per second or higher, for example up to 450,000 or even higher. This is for the reason that the depth to which the current will penetrate at the edges, such as at 11, 12, to be heated, varies according to an inverse square root law. The curve showing such depth at increasing frequencies reveals that, as the frequency increases up to about 10,000 cycles and somewhat higher, the depth of penetration rather slowly or gradually decreases, but as the frequency increases from above 50,000 up to the neighborhood of 100,000 cycles, the curve shows a comparatively sharp decrease of penetration. In other words, as the frequency approaches a range up to about 100,000 cycles, the current quite abruptly becomes more concentrated in the very edge surfaces, so that the heating and softening to welding temperature may be confined to several thousandths of an inch of depth. This leaves the metal at greater depths still rigid, enabling the softened surface to be forced firmly under pressure into welded condition and at the same time greatly increasing the efficiency of the heating operation. For example, when a frequency of about 10,000 cycles was used, but with other factors in accordance with the invention, a satisfactory weld was not obtained and the depth of penetration of the current was some three or more times greater than with a frequency of about 100,000 cycles.

While the method and apparatus as above described for the butt welding of strips together is quite satisfactory for strips which are of a thickness of more than about 1/16" for example, yet if the strips are substantially thinner, then the edges thereof may not have sufficient rigidity when forced together to remain in the desired plane without bulging or deflection and thus for welding strips thinner than about 1/16", it is desirable to arrange the apparatus for such use as to form a lapped weld. For this purpose, the apparatus may be similar to that shown in Fig. 3, for example, but with the clamps 13, 14 and 16, 17 so arranged that the ends of the strips to be welded as at 10a and 10b will assume positions as shown in Fig. 5, with the end portions overlapped but in spaced-apart relation as indicated. Then when the high frequency current is applied (while the clamping jaws 19a, 20a remain spaced apart from the welding region) the facing edge surfaces as indicated at 45 will become heated to welding temperature first, because of the mutual inductance effect between the current on these particular overlapping surface portions. Meanwhile, the opposite edge surface portions as at 46 will also become heated, but the current may be shut off before surface portions 46 become heated quite to welding temperature, although they are preferably heated enough to be forged, when, after the current is cut off, the jaws 19a, 20a are brought under high pressure engagement with the strips 10a, 10b, so that a secure lapped weld is formed as indicated at 47 and in which the plane of the strip 10a comes close to being a smooth continuation of the plane of the strip 10b.

Heretofore it has been a common practice to weld together such strip ends by methods which involve a series of overlapping spot-like welded areas and such that, even upon applying heavy pressure, the total thickness of the overlapped weld would remain for example some 70% thicker than the thickness of each single strip, thus presenting an irregular bunch or interruption at each region where the strip ends have been welded together. This interferes with convenient and efficient handling of the strip in connection with later operations performed thereon. On the other hand, with the present invention, utilized as indicated in Figs. 5 and 6, the lapped weld region is flattened out to a thickness at best only slightly greater than the thickness of each strip alone.

Alternative methods and forms of apparatus are disclosed in the co-pending application of Fred Kohler and Wallace C. Rudd, filed concurrently herewith, entitled "Welding of Strip Ends and the Like," Serial No. 722,767. In that application, improvements are disclosed according to which the high frequency current is applied in a way somewhat similar to that above described, but by the use of strips of high conductivity and of suitable dimensions and contours, arranged along in closely spaced relation in back of the edges to be welded and such that an even more improved distribution of the high frequency current along such edges may be secured, either for butt welding or lap welding.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding an elongated edge of one metal portion to an elongated edge of another metal portion, which comprises: clamping said portions respectively in positions with said edges in substantially parallel closely-spaced relation; conducting heating current from a source thereof having a frequency of the order of 100,000 cycles per second or higher onto the elongated edge of the first of said portions to flow therealong; thence conducting such current over to the other of said elongated edges and back therealong and thence back to the source; causing said current to be concentrated to substantially a uniform degree along said edges and avoiding the tendency of the current to distribute itself further away from the mid-portions of said edges than at other portions, by placing magnetic masses having a low loss factor and high volume resistivity in positions closely spaced from said members and somewhat spaced back away from said edges respectively, thereby to increase the impedance to the current flowing at said frequency along paths spaced back away from the edges and hence causing such current to be concentrated on the edges as aforesaid; discontinuing the curent flow when the opposed surfaces of said edges become heated to welding temperature; and forcing at least the adjacent parts of said metal portions into relative positions to bring the thus-heated opposed surfaces into contact for welding same together while applying confining pressure to the opposite surfaces of said portions respectively along the zone of the weld.

2. Method in accordance with the foregoing claim 1 and in which said magnetic masses are placed as specified adjacent both of the opposite surfaces of both of said metal portions.

3. Method in accordance with the foregoing claim 1 and in which the metal portions as initially brought into their respective positions, are so positioned that the edges edge surfaces thereof are opposed to each other in alignment and when the heated opposed surfaces are brought into contact, said end edge surfaces become butt-welded together.

4. Method in accordance with the foregoing claim 1 and in which the metal portions, as initially brought into their respective positions, are so positioned that the edges are in overlapped closely spaced relation and the heating current is maintained until the opposed surfaces which overlap and face each other become heated to welding temperature, while the edge parts on the surfaces of the members opposite from the facing overlapped surfaces, are heated to forging temperature, and after the heating current has been discontinued, the overlapped edges are forced into contact to form a lapped weld, and the confining pressure applied to the welding zone is sufficient to forge the lap-welded areas to a substantially reduced thickness as compared with the total of the thicknesses of the two edges initially.

5. In the welding of an edge of a metal portion to an opposed edge of another metal portion by conducting for a predetermined interval, heating current from a high frequency source onto the first of said edges to flow therealong, thence over to the other of said edges while the latter is located in closely-spaced relation to the first edge, the current flowing along such other edge and thence back to the source, and by thereafter forcing the thus-heated edges together under pressure; the method of causing such current to be confined sufficiently closely to the opposed edges to cause the heating thereof to welding temperature to be confined within a depth of several thousandths of an inch and with such uniformity along the edges that the mid-portions thereof are thus heated to welding temperature while the other portions of such edges also are substantially concurrently thus heated; said method comprising: utilizing for such heating current a frequency of the order of 100,000 cycles per second or higher, and providing along lines spaced back from said edges, paths of flow for said current which have a sufficiently higher impedance at said frequency than the impedance of the paths at said edges, to cause such current to be so concentrated along at the edges as to heat the mid-portions of the edges substantially as rapidly as the other portions thereof.

6. Apparatus for welding an elongated edge of one metal portion to an elongated edge of another metal portion comprising in combination: clamping means for clamping said portions respectively in positions with their said edges extending along each other in closely spaced relation; means for conducting heating current from a source having a frequency of the order of 100,000 cycles per second or higher onto the elongated edge of the first of said metal portions to flow therealong; means for thence conducting such current to the other of said elongated edges to flow back therealong and thence back to the source; impedance controlling means for causing said current to be concentrated along said edges and for avoiding the tendency of the current to distribute itself further away from the mid-portions of said edges than at other portions, said impedance controlling means being in the form of magnetic masses having a low loss factor and high volume resistivity, mounted in positions closely spaced from said metal portions and somewhat spaced back away from the positions of said edges respectively, thereby to increase the impedance of the current flowing at said frequency along paths spaced back away from the edges; and means for forcing the opposed surfaces of said edges, after heating to welding temperature, into contact for welding same together and for applying confining pressure to the opposite surfaces of said metal portions respectively along the zone of the weld.

7. Apparatus in accordance with claim 6 and in which said magnetic masses are provided as specified adjacent both of the opposite surfaces of both of the metal portions.

8. Apparatus in accordance with the foregoing claim 6 and in which said clamping means are arranged initially to retain said metal portions in positions such that the end edge surfaces thereof are opposed to each other in alignment and the means for forcing said edges into contact after heating to welding temperature, are arranged to force the end edge surfaces into butt-welded engagement.

9. Apparatus in accordance with the foregoing claim 6 and in which said clamping means is arranged for initially positioning said edges in overlapped closely-spaced relation and the means for forcing the opposed surfaces of said edges after heating to welding temperature into welding contact, is arranged to apply confining pressure to the overlapped edges sufficient to forge the lapped welded areas to a substantially reduced thickness.

10. In the welding of an edge of a metal portion to an opposed edge of another metal portion by conducting for a predetermined interval, heating current from a high frequency source onto the first of said edges to flow therealong, thence over to the other of said edges while the latter is located in closely-spaced relation to the first edge, the current flowing along such other edge and thence back to the source, and by thereafter forcing the thus-heated edges together under pressure; the method of causing such current to be confined sufficiently closely to the opposed edges to cause the heating thereof to welding temperature to be confined within a shallow depth with such uniformity that the edges at the middle parts thereof are thus heated to welding temperature while the other parts of such edges also are substantially concurrently thus heated, said method comprising: providing along lines spaced back from said edges paths of flow for said high frequency current which have a sufficiently higher impedance at the frequency used than the impedance of the paths at said edges, to cause such current to be so concentrated along on the edges as to heat the middle parts of the edges substantially as rapidly as the other parts thereof.

11. Method in accordance with the foregoing claim 10 and in which masses of magnetic material are placed adjacent to, but spaced from, the middle parts of said edges to cause said paths of flow for said current to have the higher impedance along lines spaced back from the middle parts of said edges.

References Cited in the file of this patent

UNITED STATES PATENTS

| | | |
|---|---|---|
| 870,847 | Rietzel | Nov. 12, 1907 |
| 1,544,201 | Waters | June 30, 1925 |
| 2,020,276 | Crawford | Nov. 5, 1935 |
| 2,066,668 | Bennett | Jan. 5, 1937 |

UNITED STATES PATENT OFFICE
CERTIFICATE OF CORRECTION

Patent No. 2,919,343 December 29, 1959

Wallace C. Rudd

It is hereby certified that error appears in the printed specification of the above numbered patent requiring correction and that the said Letters Patent should read as corrected below.

Column 6, line 31, for "edges" read -- end --.

Signed and sealed this 31st day of May 1960.

(SEAL)
Attest:

KARL H. AXLINE
Attesting Officer

ROBERT C. WATSON
Commissioner of Patents